US011532993B1

(12) United States Patent
Dwari et al.

(10) Patent No.: US 11,532,993 B1
(45) Date of Patent: Dec. 20, 2022

(54) AC-TO-AC POWER SUPPLIES USING MULTI-FREQUENCY POWER CONVERSION BUILDING BLOCKS

(71) Applicant: B/E Aerospace, Inc., Winston-Salem, NC (US)

(72) Inventors: Suman Dwari, Vernon, CT (US); Parag M. Kshirsagar, South Windsor, CT (US); Jeffrey Ewanchuk, Manchester, CT (US); Baljit Singh Riar, East Hartford, CT (US); Brian St. Rock, Andover, CT (US)

(73) Assignee: B/E Aerospace, Inc, Winston-Salem, NC (US)

( * ) Notice: Subject to any disclaimer, the term of this patent is extended or adjusted under 35 U.S.C. 154(b) by 0 days.

(21) Appl. No.: 17/496,481

(22) Filed: Oct. 7, 2021

(51) Int. Cl.
*H02M 7/537* (2006.01)
*H02M 5/458* (2006.01)
*H02M 1/00* (2006.01)
*B60R 16/03* (2006.01)

(52) U.S. Cl.
CPC ........... *H02M 5/4585* (2013.01); *B60R 16/03* (2013.01); *H02M 1/0003* (2021.05); *H02M 1/0064* (2021.05); *H02M 7/537* (2013.01); *B64D 2221/00* (2013.01)

(58) Field of Classification Search
CPC ............. H02M 5/4585; H02M 1/0064; H02M 1/0003; H02M 7/537; B60R 16/03; B64R 2221/00
See application file for complete search history.

(56) References Cited

U.S. PATENT DOCUMENTS

| | | |
|---|---|---|
| 3,566,243 A | 2/1971 | Landis |
| 5,592,368 A | 1/1997 | Bidaud et al. |
| 5,598,326 A | 1/1997 | Liu et al. |
| 6,466,464 B1 | 10/2002 | Drobnik |
| 9,919,610 B1 | 3/2018 | Sarwat et al. |
| 2015/0229227 A1* | 8/2015 | Aeloiza ................... H02M 5/04 323/355 |

(Continued)

FOREIGN PATENT DOCUMENTS

| | | |
|---|---|---|
| CN | 104883068 B | 3/2018 |
| EP | 1171946 A4 | 7/2004 |
| EP | 3223419 B1 | 5/2019 |

(Continued)

*Primary Examiner* — Adolf D Berhane
(74) *Attorney, Agent, or Firm* — Suiter Swantz pc llo (57) ABSTRACT

An apparatus for modular AC to AC frequency conversion is disclosed. An input AC source is configured to generate an input AC voltage at a first frequency. At least one primary low frequency (LF) conversion stage is configured to generate a DC voltage, and comprises a first pair of metal-oxide-semiconductor field effect transistors (MOSFETs). At least one primary high frequency (HF) conversion stage is configured to generate the DC voltage, and comprises a first pair of high electron mobility transistors (HEMTs). At least one secondary LF conversion stage is configured to receive the DC voltage and generate an output AC voltage at a second frequency, and comprises a second pair of MOSFETs. At least one secondary HF conversion stage is configured to receive the DC voltage and generate the output AC voltage at the second frequency, and comprises a second pair of HEMTs.

15 Claims, 5 Drawing Sheets

(56) References Cited

U.S. PATENT DOCUMENTS

2021/0313898 A1* 10/2021 Stewart ................ H02M 5/293

FOREIGN PATENT DOCUMENTS

| | | |
|---|---|---|
| GB | 2048588 B | 8/1983 |
| IN | 25KOL2015 A | 1/2015 |
| JP | 1986240856 A1 | 10/1986 |
| WO | 2018059672 A1 | 4/2018 |
| WO | 2021047130 A1 | 3/2021 |
| WO | 2021134033 A1 | 7/2021 |

* cited by examiner

AC-TO-AC POWER SUPPLIES USING MULTI-FREQUENCY POWER CONVERSION BUILDING BLOCKS

BACKGROUND

Electrical power supplies in aerospace applications are characterized by a wide range of stringent requirements. Examples of such power supplies include alternating current (AC) to AC power supplies that convert power from a higher frequency, such as 300 Hz, to a lower frequency, such as 60 Hz. Conventional AC-to-AC power supplies include multiple power conversion stages that are difficult to customize for target applications, and are thus larger, heavier, difficult to scale, and expensive to manufacture.

SUMMARY

An apparatus for modular AC to AC frequency conversion is disclosed in accordance with one or more illustrative embodiments of the present disclosure. The apparatus comprises an input AC source configured to generate an input AC voltage at a first frequency; at least one low frequency (LF) input AC voltage terminal connected to the input AC source; at least one high frequency (HF) input AC voltage terminal connected to the input AC source; at least two output DC voltage terminals; at least one primary LF conversion stage configured to receive the input AC voltage at the first frequency and generate a DC voltage, comprising: a first pair of metal-oxide-semiconductor field effect transistors (MOSFETs) connected to the at least one LF input AC voltage terminal and the at least two output DC voltage terminals; at least one primary HF conversion stage configured to receive the input AC voltage at the first frequency and generate the DC voltage, comprising: a first pair of high electron mobility transistors (HEMTs) connected to the at least one HF input AC voltage terminal and the at least two output DC voltage terminals; a capacitor configured to store energy of the DC voltage; at least two input DC voltage terminals, wherein each of the input DC voltage terminals are connected to a respective one of the output DC voltage terminals; at least one LF output AC voltage terminal; at least one HF output AC voltage terminal; at least one secondary LF conversion stage configured to receive the DC voltage and generate an output AC voltage at a second frequency, comprising: a second pair of MOSFETs connected to the at least two input DC voltage terminals and the at least one LF output AC voltage terminal; at least one secondary HF conversion stage configured to receive the DC voltage and generate the output AC voltage at the second frequency, comprising: a second pair of HEMTs connected to the at least two input DC voltage terminals and the at least one HF output AC voltage terminal; and an output AC load configured to receive the output AC voltage at the second frequency.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Electrical power supplies used in aerospace applications (e.g., aircraft seat power supplies) are characterized by a wide range of stringent requirements, stemming from various implementation constraints of the end product. For example, an electrical power supply may contribute to the overall weight of an aircraft, and is therefore ideally designed to be as light as possible. Each customer of such power supplies may have different requirements (e.g., depending on the type of aircraft).

Conventional AC-to-AC power supplies (e.g., that convert AC current at a first frequency to an AC current at a second frequency) include multiple power conversion stages that are difficult to customize for target applications, and are thus larger, heavier, difficult to scale, and expensive to manufacture. When implementing the conventional solution, the equipment manufacturer must either produce an individual, optimal design for each customer, thus increasing the development cost for each product, or produce an over-designed product that may not be competitive in terms of volume or weight compared to competing devices.

Figure 1:
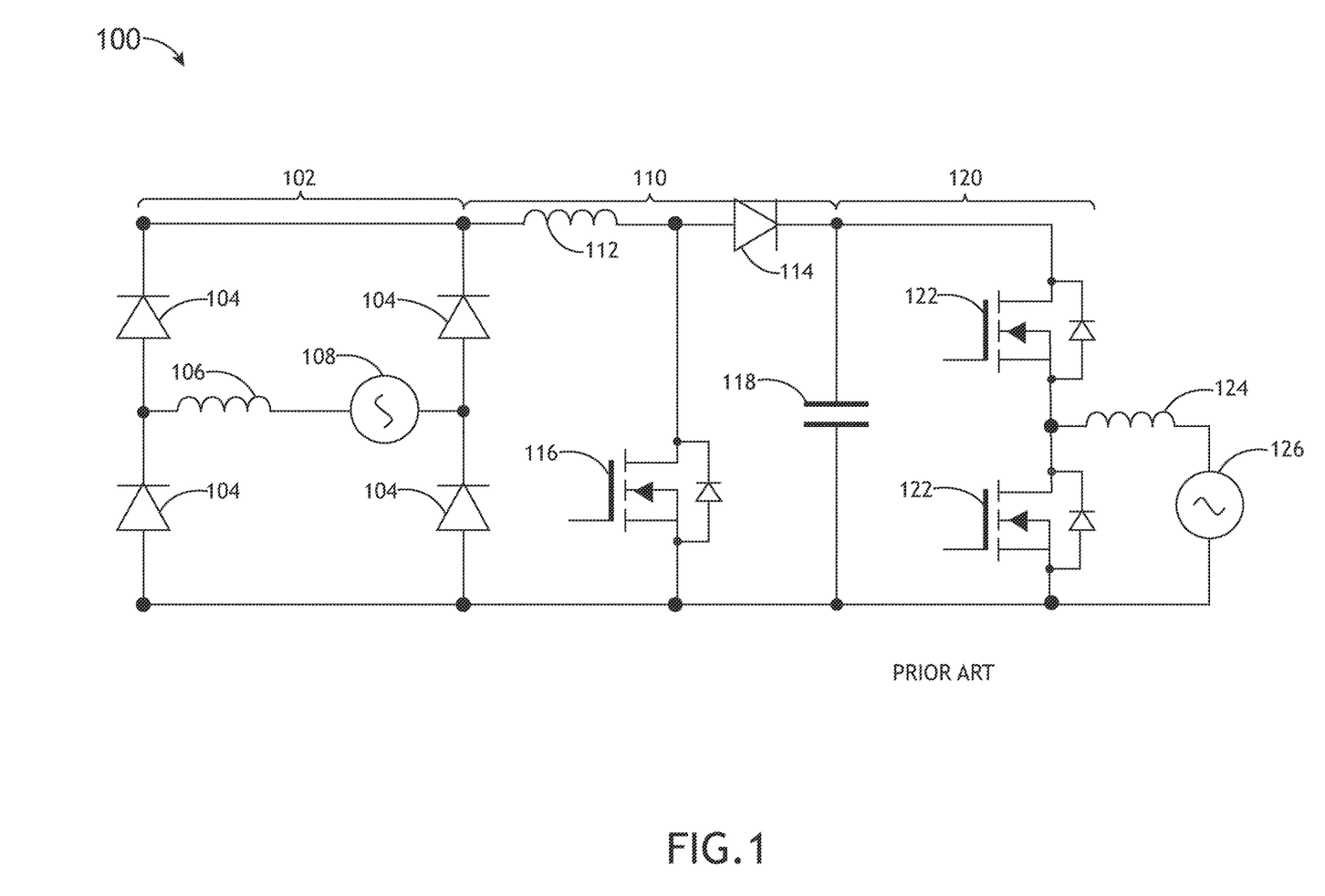
FIG. 1 is a circuit diagram of a conventional apparatus for AC to AC frequency conversion.

FIG. 1 is a circuit diagram of a conventional apparatus 100 for AC to AC frequency conversion. The apparatus includes a rectifier 102 that converts an input alternating current (generated by source 108) to a direct current (DC). The rectifier 102 includes an inductor 106 and a plurality of diodes 104. A boost converter 110 steps up the DC voltage. The boost converter 110 includes an inductor 112, a diode 114, a transistor 116, and a capacitor 118. Finally, an inverter 120 converts the DC back to an output AC (represented by output AC load 126). The inverter 120 includes two transistors 122 and an inductor 125.

The conventional apparatus 100 includes multiple different power conversion stages (the rectifier 102, the boost converter 110, and the inverter 120). Since each conversion stage is fixed in design, the conventional apparatus 100 is difficult to customize for weight, volume and cost requirements of various applications (for example, different aircraft having different sizes). Thus, a customizable solution that solves the above problems is desirable.

Embodiments of the present disclosure are directed to an apparatus for modular AC to AC frequency conversion. The present apparatus includes high frequency (HF) conversion stages and low frequency (LF) conversion stages that are modular. In this way, the conversion stages (e.g., modules or building blocks) are attachable and detachable to the circuit, such that units can be added and removed based on the power and frequency requirements of a particular application (which can vary between each customer, e.g., different aircraft having different sizes, different amounts of aircraft seats, etc.).

Figure 2:
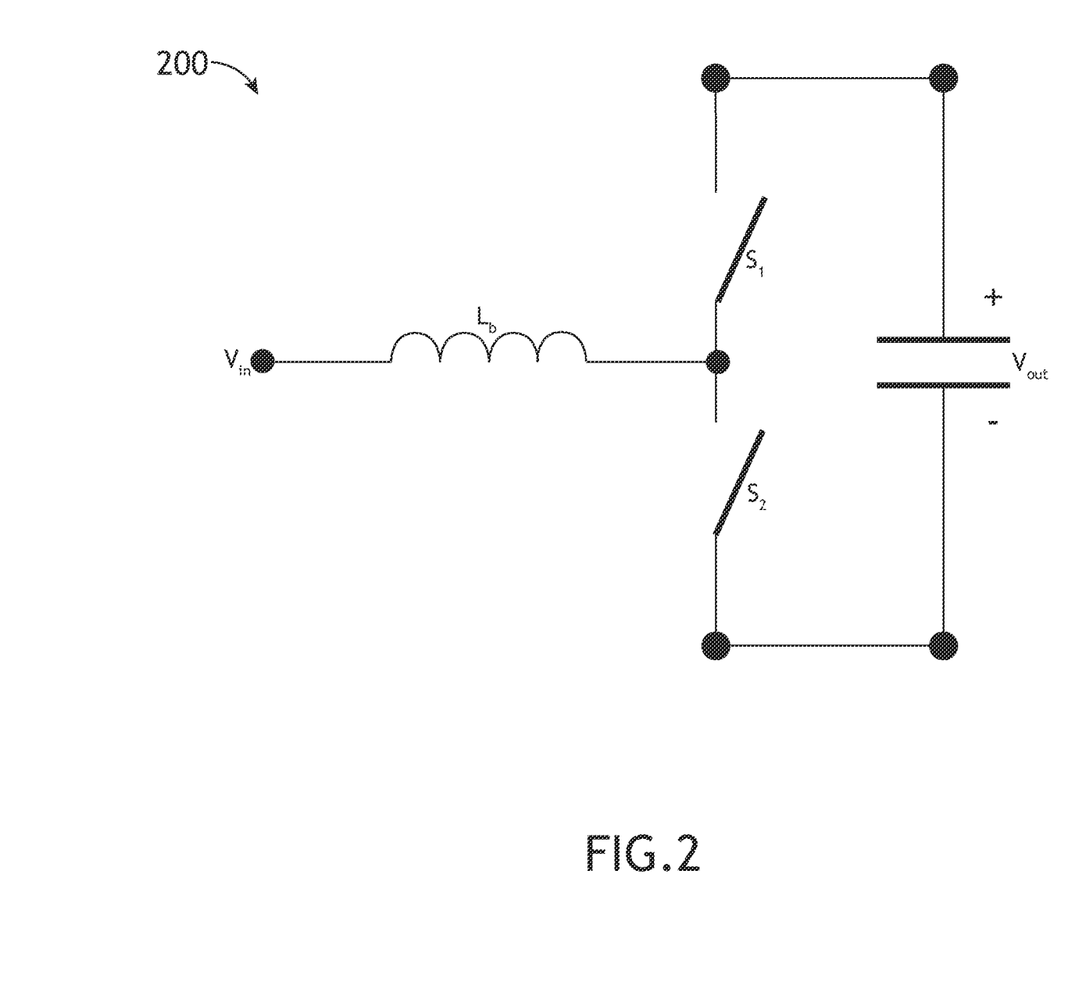
FIG. 2 is a circuit diagram of a high frequency conversion stage, in accordance with one or more embodiments of the present disclosure.

FIG. 2 is a circuit diagram of an HF conversion stage 200, in accordance with one or more embodiments of the present disclosure. After the input voltage $V_{in}$ passes a inductor $L_b$, the current is then rectified by two parallel switches $S_1$ and $S_2$ to generate a DC output voltage $V_{out}$. The inductor $L_b$ is configured to remove ripple in the DC current due to incomplete suppression of the alternating waveform after rectification.

The switches $S_1$ and $S_2$ may be controlled by pulse-width-modulation (PWM) using a PWM signal and a PWM controller. PWM controls (e.g., reduces) the average power delivered by the current by partitioning the signal into discrete parts. The average value of voltage and current fed to the load is controlled by turning the switches $S_1$ and $S_2$ between supply ($V_{in}$) and load ($V_{out}$) on and off at a fast rate. The longer the switches $S_1$ and $S_2$ on compared to the off periods, the higher the total power supplied to the load $V_{out}$. The PWM switching frequency has to be high enough not to affect the load $V_{out}$ such that the resultant waveform perceived by the load is smooth (continuous). In some embodiments, the PWM-controlled switching frequency of the switches $S_1$ and $S_2$ may be of from 10 KHz to 1000 KHz, and may be adjusted depending on the target voltage and target converted frequency of a particular application.

In some embodiments, the switches $S_1$ and $S_2$ comprise high electron mobility transistors (HEMTs), also known as heterostructure field effect transistors (HFETs) or modulation-doped field effect transistors (MODFETs). HEMTs are field-effect transistors that include a junction between two materials with different band gaps (i.e., a heterojunction) as the channel instead of a doped region (as is generally the case for a MOSFET). In some embodiments, the switches $S_1$ and $S_2$ may comprise gallium nitride (GaN) based HEMTs (e.g., for lower voltage applications). In some embodiments, the switches $S_1$ and $S_2$ may comprise silicon carbide (SiC) based HEMTs (e.g., for higher voltage applications).

Figure 3:
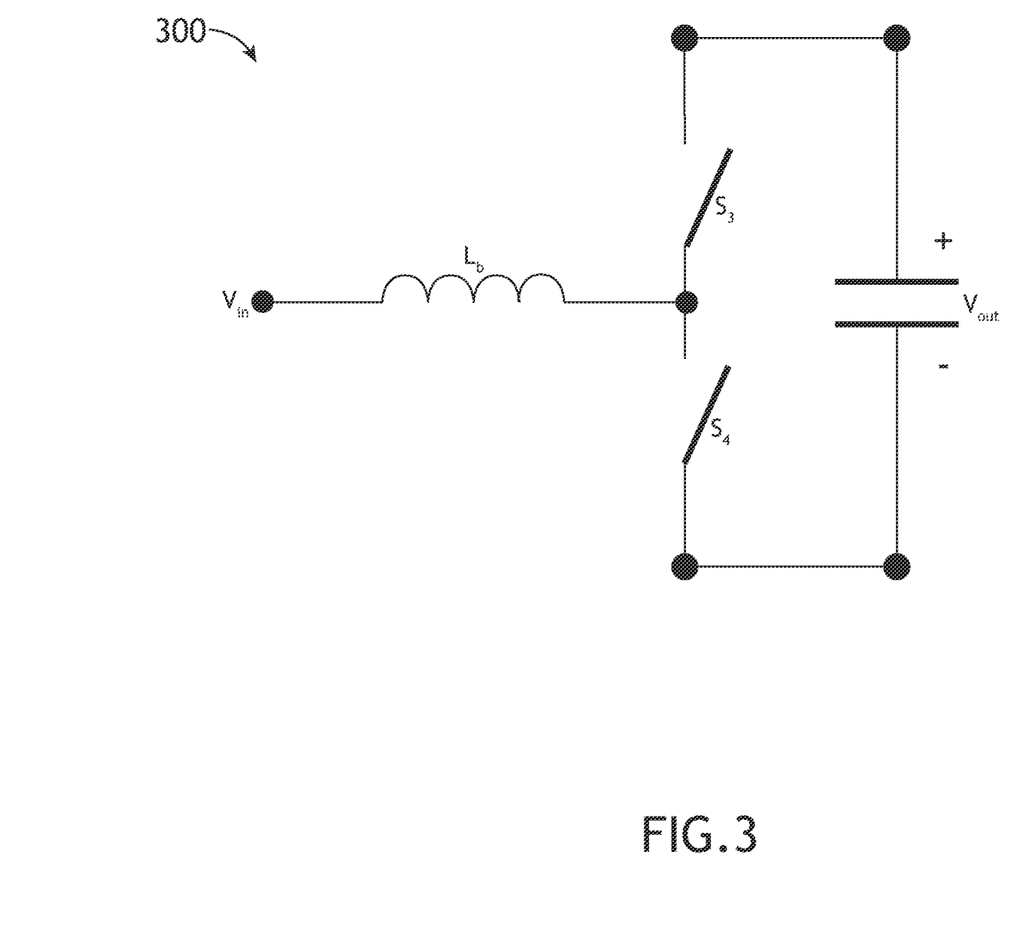
FIG. 3 is a circuit diagram of a low frequency conversion stage, in accordance with one or more embodiments of the present disclosure.

FIG. 3 is a circuit diagram of an LF conversion stage 300, in accordance with one or more embodiments of the present disclosure. After the input voltage V passes a inductor $L_b$, the current is then rectified by two parallel switches $S_3$ and $S_4$ to generate a DC output voltage $V_{out}$. The inductor $L_b$ is configured to remove ripple in the DC current due to incomplete suppression of the alternating waveform after rectification. The switches $S_3$ and $S_4$ may have a switching frequency of from 10 Hz to 1 KHz (i.e., orders of magnitude lower than the switching rate of the PWM-controlled switches $S_1$ and $S_2$ of the HF conversion stage 200). The LF conversion stage 300, when arranged in parallel with one or more HF conversion stages 200, may be configured to return current from the HF conversion stages 200.

In some embodiments, the switches $S_3$ and $S_4$ may comprise silicon (Si) based metal-oxide-semiconductor field effect transistors (MOSFETs). Although the switches $S_3$ and $S_4$ may also be GaN based or SiC based (e.g., for high performance), using Si based switches $S_3$ and $S_4$ for the LF conversion stage 300 may reduce cost significantly when paired with switches $S_1$ and $S_2$ for the HF conversion stage 200 that are GaN based or SiC based (since GaN and SiC are relatively expensive compared to Si).

In some embodiments, the switches $S_3$ and $S_4$ may comprise power MOSFETs. A power MOSFET may have a vertical diffused MOS (VDMOS) structure (also called double-diffused MOS or DMOS). In a VDMOS, the source electrode is placed over the drain, resulting in a current mainly vertical when the transistor is in the on-state. With a vertical structure, the voltage rating of the transistor is a function of the doping and thickness of the N epitaxial layer, while the current rating is a function of the channel width. This vertical structure makes it possible for the transistor to sustain both high blocking voltage and high current within a compact piece of silicon. When the power MOSFET is in the on-state, the power MOSFET exhibits a resistive behavior between the drain and source terminals. When the power MOSFET is in the off-state, the power MOSFET is equivalent to a PIN diode.

In some embodiments, the switches $S_3$ and $S_4$ may comprise super junction MOSFETs. In a super junction MOSFET, the N layer and P layers are arranged as vertical trenches in the drift layer, so that when voltage is applied, the depletion layers expand horizontally, and soon merge to form a depletion layer equal to the depth of the trenches. The depletion layer only expands to half the pitch of the trenches, so a depletion layer is formed with a thickness equal to the depth of the trenches. The expansion of the depletion layer is small, allowing for an approximately 5 times increase in the drift layer impurity concentration.

Figure 4:
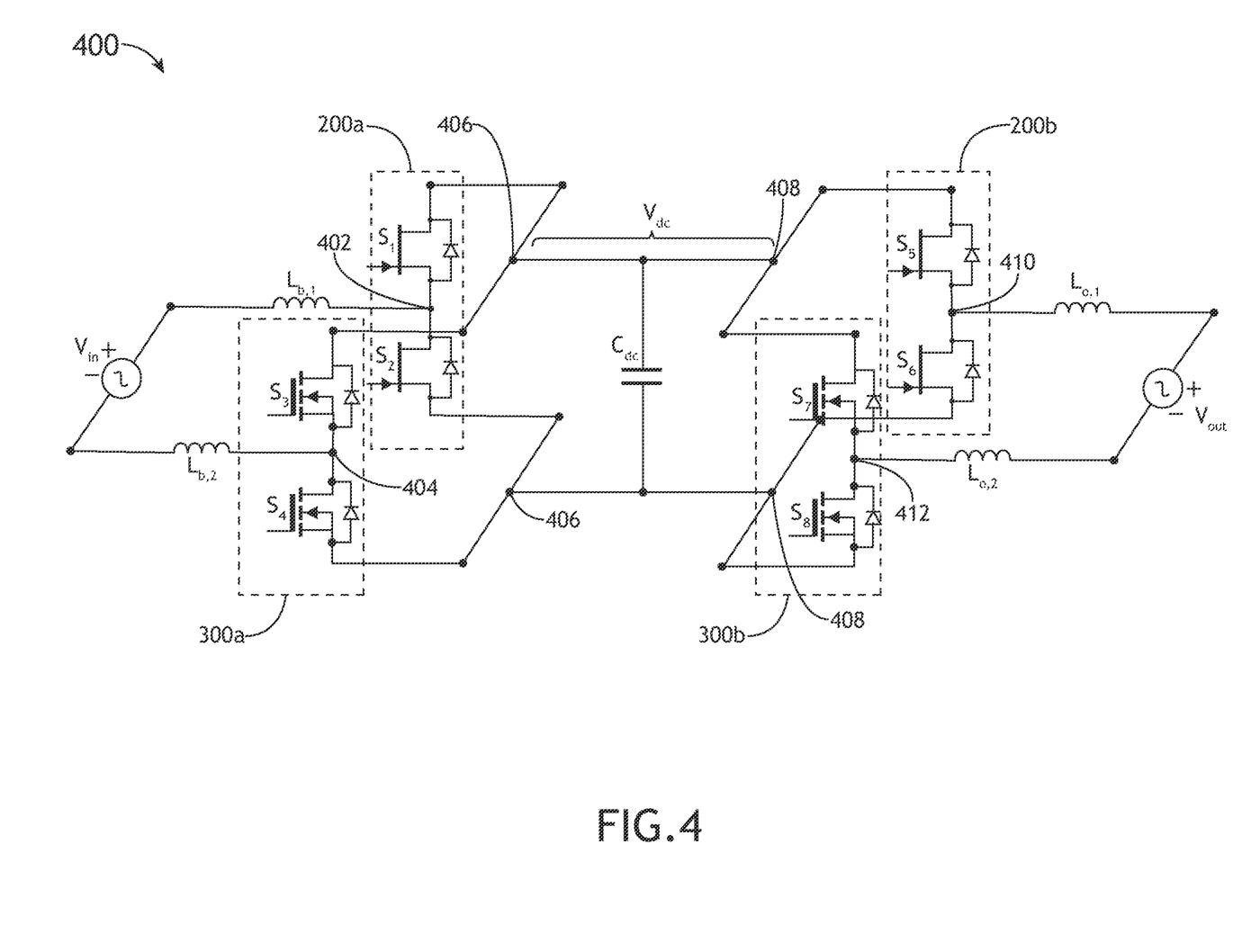
FIG. 4 is a circuit diagram of a modular AC to AC frequency conversion apparatus, in accordance with one or more embodiments of the present disclosure.

FIG. 4 is a circuit diagram of a modular AC to AC frequency conversion apparatus 400, in accordance with one or more embodiments of the present disclosure. One or more primary HF conversion stages 200a and one or more primary LF conversion stages 300a are configured to convert an input AC voltage $V_{in}$ to an intermediate DC voltage $V_{dc}$. One or more secondary HF conversion stages 200a and one or more secondary LF conversion stages 300a are configured to convert the intermediate DC voltage $V_{dc}$ to an output AC voltage $V_{out}$.

An input AC source (e.g., generator) may be configured to generate an input AC voltage $V_{in}$ at a first frequency. The input AC source may be, for example, an aircraft power supply. The first frequency may be, for example, of from 300 Hz to 750 Hz. This first frequency may be significantly higher than the operating frequency of household and portable electronics that may be used by passengers (for example, 50 Hz or 60 Hz), and thus, may be converted to the appropriate frequency (e.g, to power an electrical outlet or USB port at an aircraft seat) using the apparatus 400.

The one or more primary HF conversion stages 200a may be substantially identical to the HF conversion stage 200 described with respect to FIG. 2. Each HF conversion stage 200a may comprise a first pair of HEMTs $S_1$ and $S_2$ (controlled by PWM as described with respect to FIG. 2). At least one HF input AC voltage terminal 402 may be respectively connected to the input AC source. At least one inductor $L_{b,1}$ may be respectively connected to the one or more primary HF conversion stages 200a (using the terminal 402) and the input AC source.

The one or more primary LF conversion stages 300a may be substantially identical to the LF conversion stage 300 described with respect to FIG. 3. Each LF conversion stage 300a may comprise a first pair of MOSFETs $S_3$ and $S_4$. At least one LF input AC voltage terminal 404 may be respectively connected to the input AC source. At least one inductor $L_{b,2}$ may be respectively connected to the one or more primary LF conversion stages 300a (using the terminal 404) and the input AC source.

At least two output DC voltage terminals 406 may be configured to receive the intermediate DC voltage $V_{dc}$ generated by the conversion stages 200a and 300a. In some embodiments, the switch $S_1$ may be connected in parallel with the switch $S_3$ to one of the terminals 406, and the switch $S_2$ may be connected in parallel with the switch $S_4$ to the other of the terminals 406.

In some embodiments, a capacitor $C_{dc}$ may be configured to store energy of the intermediate DC voltage $V_{dc}$. At least two input DC voltage terminals 408 may be configured to receive the intermediate DC voltage $V_{dc}$ from the output DC voltage terminals 406. Each of the terminals 408 may be connected to a respective one of the terminals 406, and the capacitor $C_{dc}$ may bridge the connections between the terminals 406 and 408. The terminals 408 may be configured to transmit the intermediate DC voltage $V_{dc}$ to the one or more secondary HF conversion stages 200b and the one or more secondary LF conversion stages 300b.

The one or more secondary HF conversion stages 200b may be substantially identical to the HF conversion stage 200 described with respect to FIG. 2, and may be configured to convert the intermediate DC voltage $V_{dc}$ to an output AC voltage $V_{out}$. Each HF conversion stage 200a may comprise a second pair of HEMTs $S_3$ and $S_6$ (controlled by PWM as described with respect to FIG. 2). At least one HF output AC voltage terminal 410 may be respectively connected to an output AC load. At least one inductor $L_{o,1}$ may be respectively connected to the one or more secondary HF conversion stages 200b (using the terminal 410) and the output AC load.

The one or more secondary LF conversion stages 300b may be substantially identical to the HF conversion stage 300 described with respect to FIG. 3, and may be configured to convert the intermediate DC voltage $V_{dc}$ to an output AC voltage $V_{out}$. Each LF conversion stage 300b may comprise a second pair of MOSFETs $S_7$ and $S_8$. At least one LF output AC voltage terminal 412 may be respectively connected to an output AC load. At least one inductor $L_{o,2}$ may be respectively connected to the one or more secondary HF conversion stages 300b (using the terminal 412) and the output AC load.

In some embodiments, the switch $S_5$ is connected in parallel with the switch $S_7$ to one of the terminals 408, and the switch $S_6$ is connected in parallel with the switch $S_8$ to the other of the terminals 408. After exiting the secondary conversion stages 200b and 300b, the AC voltage $V_{out}$ may have a target power and a target frequency (e.g., 50 or 60 Hz). In some embodiments, the output AC load is a plurality of aircraft seat power supplies, and each secondary HF conversion stage 200 may correspond to an aircraft seat (or a row or section of aircraft seats). However, the present disclosure is not limited thereto, and the output AC load may include, for example, an aircraft oven, an aircraft microwave, etc.

Figure 5:
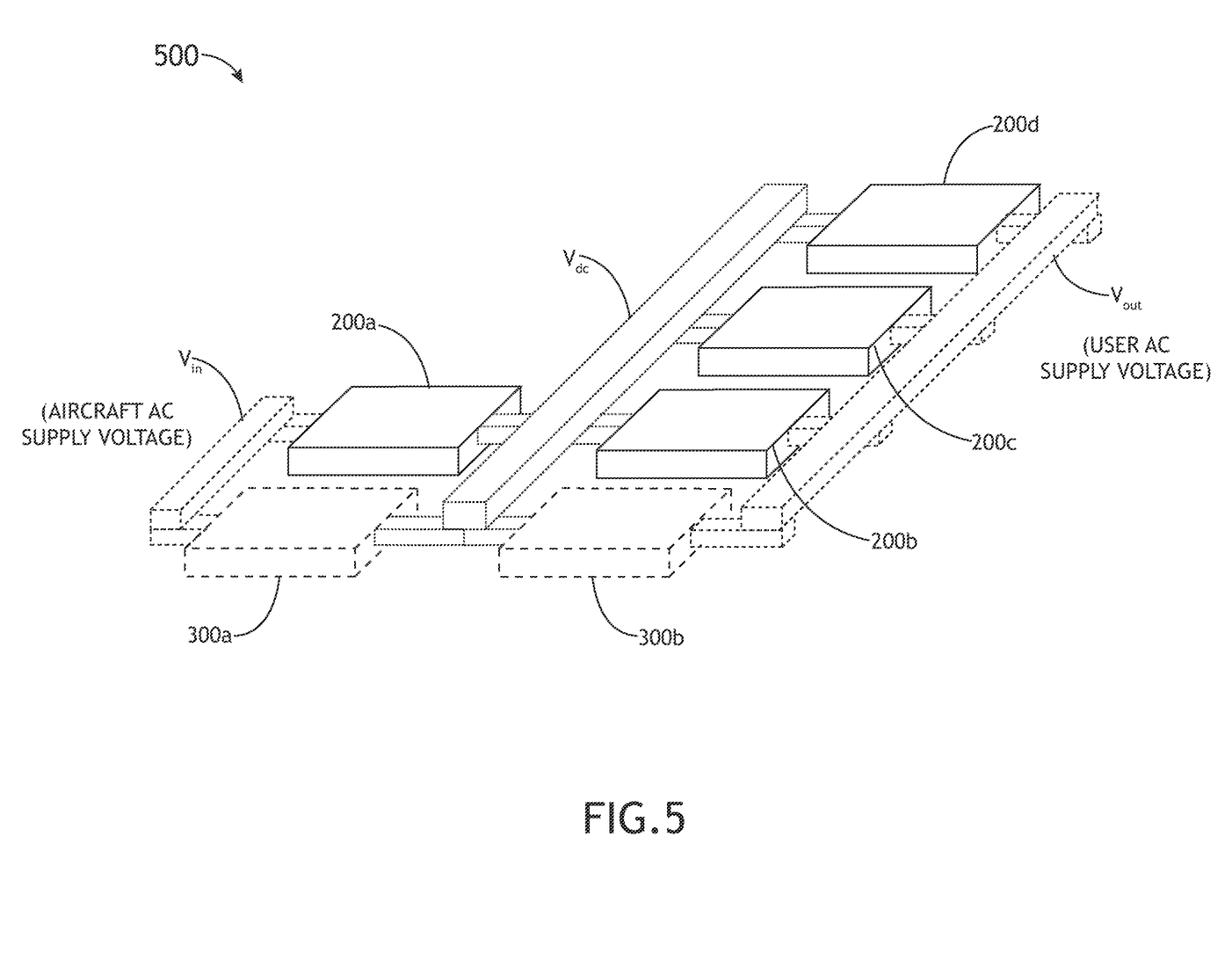
FIG. 5 is a simplified diagram of a modular AC to AC frequency conversion apparatus including additional HF conversion stages, in accordance with one or more embodiments of the present disclosure.

FIG. 5 is a simplified diagram of a modular AC to AC frequency conversion apparatus 500, in accordance with one or more embodiments of the present disclosure. The apparatus 500 may be substantially identical to the apparatus 400 described with respect to FIG. 4, however, the apparatus 500 may include additional secondary HF conversion stages 200c and 200d (connected in parallel with the secondary HF conversion stage 200b and the secondary LF conversion stage 300b). In this way, the conversion stages 200 and 300 may be modular (attachable and detachable to the circuit, such that conversion stages 200 and 300 can be added to the apparatus 500 or removed from the apparatus 500 based on the power and frequency requirements). Each conversion stage may be designed to use a filter inductor with the same rating, regardless of how many conversion stages are installed to meet a particular power level requirement.

The present apparatus achieves a higher efficiency and a higher power density over the conventional solution. The modular capability of the present apparatus enables frequency conversion for varying power supply applications without having to constantly design new converter components, thus reducing costs while improving performance in weight, size, loss, and temperature control.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An apparatus for modular alternating current (AC) to AC frequency conversion, comprising:
   an input AC source configured to generate an input AC voltage at a first frequency;
   at least one low frequency (LF) input AC voltage terminal connected to the input AC source;
   at least one high frequency (HF) input AC voltage terminal connected to the input AC source;
   at least two output DC voltage terminals;
   at least one primary LF conversion stage configured to receive the input AC voltage at the first frequency and generate a DC voltage, comprising:
      a first pair of metal-oxide-semiconductor field effect transistors (MOSFETs) connected to the at least one LF input AC voltage terminal and the at least two output DC voltage terminals;
   at least one primary HF conversion stage configured to receive the input AC voltage at the first frequency and generate the DC voltage, comprising:
      a first pair of high electron mobility transistors (HEMTs) connected to the at least one HF input AC voltage terminal and the at least two output DC voltage terminals;
   a capacitor configured to store energy of the DC voltage;
   at least two input DC voltage terminals, wherein each of the input DC voltage terminals are connected to a respective one of the output DC voltage terminals;
   at least one LF output AC voltage terminal;
   at least one HF output AC voltage terminal;
   at least one secondary LF conversion stage configured to receive the DC voltage and generate an output AC voltage at a second frequency, comprising:
      a second pair of MOSFETs connected to the at least two input DC voltage terminals and the at least one LF output AC voltage terminal;
   at least one secondary HF conversion stage configured to receive the DC voltage and generate the output AC voltage at the second frequency, comprising:
      a second pair of HEMTs connected to the at least two input DC voltage terminals and the at least one HF output AC voltage terminal; and
   an output AC load configured to receive the output AC voltage at the second frequency.

2. The apparatus of claim 1, comprising at least one inductor connected to the at least one primary LF conversion stage and the input AC source, and at least one inductor connected to the at least one primary HF conversion stage and the input AC source.

3. The apparatus of claim 1, comprising at least one inductor connected to the at least one secondary LF conversion stage and the output AC load, and at least one inductor connected to the at least one secondary HF conversion stage and the output AC load.

4. The apparatus of claim 1, wherein the at least one primary LF conversion stage comprises a plurality of primary LF conversion stages.

5. The apparatus of claim 1, wherein the at least one primary HF conversion stage comprises a plurality of primary HF conversion stages.

6. The apparatus of claim 1, wherein the at least one secondary LF conversion stage comprises a plurality of secondary LF conversion stages.

7. The apparatus of claim 1, wherein the at least one secondary HF conversion stage comprises a plurality of secondary HF conversion stages.

8. The apparatus of claim 1, wherein the first pair of MOSFETs and the second pair of MOSFETS comprise silicon (Si) based power MOSFETs.

9. The apparatus of claim 1, wherein the first pair of MOSFETs and the second pair of MOSFETS comprise silicon (Si) based super junction MOSFETs.

10. The apparatus of claim 1, wherein the first pair of HEMTs and the second pair of HEMTS comprise silicon carbide (SiC) based HEMTs.

11. The apparatus of claim 1, wherein the first pair of HEMTs and the second pair of HEMTS comprise gallium nitride (GaN) based HEMTs.

12. The apparatus of claim 1, wherein the first frequency is of from 300 to 750 Hz, and the second frequency is of from 50-60 Hz.

13. The apparatus of claim 1, wherein the input AC source is an aircraft power supply, and the output AC load is a plurality of aircraft seat power supplies.

14. The apparatus of claim 1, wherein the the first pair of MOSFETs and the second pair of MOSFETS have a switching frequency of from 10 Hz to 1 KHz.

15. The apparatus of claim 1, wherein the first pair of HEMTs and the second pair of HEMTS have a pulse width modulated (PWM) switching frequency of from 10 KHz to 1000 KHz.

* * * * *